United States Patent Office 3,251,798
Patented May 17, 1966

3,251,798
ELASTOMER COMPOUNDING PROCESS
Frank Pollien, Fairfield, Conn., assignor to E. I. du Pont de Nemours and Company, Wilmington, Del., a corporation of Delaware
No Drawing. Filed May 15, 1962, Ser. No. 194,953
1 Claim. (Cl. 260—34.2)

This invention relates to a method of preparing elastomeric compositions and it particularly relates to an improved method for incorporating dry ingredients in plasticized elastomeric compositions.

Heretofore, in the preparation of rubber and other elastomeric polymer compositions for calender coating and similar uses, considerable difficulty has been experienced in obtaining both a fast and a complete dispersion of the compounding ingredients, i.e., pigments, fillers, curing agents and plasticizers. This problem has been particularly severe in compositions requiring relatively large amounts of plasticizer.

Conventionally, elastomeric calenderable compositions have been prepared by masticating the elastomer on a two-roll mill or in a Banbury mixer and then slowly adding the other ingredients during the mastication. If short mixing times are used, dispersion is not complete and undispersed agglomerates of the ingredients remain in the stock either lowering the physical properties and quality of the final product or requiring that the stock be extruded through strainers to remove or break up undispersed particles or agglomerates.

On the other hand, long mixing cycles and straining are expensive and tend to degrade the elastomer and aggravate premature curing or scorching with resulting low quality or even complete loss of the process stock.

A review of the several factors inherent in elastomer processing that hinder good dispersion will help to clarify the problem.

One of these factors is the generation of heat during mastication and incorporation of ingredients. Heat build-up during the early stages of mixing is often so great that only a portion of the ingredients can be added before it is necessary to remove the partially compounded stock from the mixer for cooling to avoid degradation or pre-cure of the polymer. Following cooling, the partially compounded stock can be returned to the mixer and additional ingredients added. These steps may have to be repeated several times before a completed composition is obtained. The heat build-up problem is especially critical after vulcanizing agents are added to the stock, and it is common practice to withhold them until the end of a mix, risking poor dispersion, rather than loss of the stock through premature cure.

Another factor, besides heat build-up, is the softening of the elastomer for mastication, heat generation or addition of plasticizer. This comes about because the softened elastomer mass has lost its shear characteristics, and the particles of the compounding ingredients refuse to disperse uniformly. Where large amounts of liquid plasticizer or softeners are required, extended mixing cycles usually have to be used to achieve satisfactory dispersion. Addition of the liquid early in the mixing cycle promotes poor dispersion as does addition of the liquid during the presence of dry powder ingredients before the latter is dispersed in the elastomer. Addition of liquid ingredients after the dry ingredients are incorporated in the elastomer, though giving adequate dispersions, seriously prolongs the mixing cycle because of the slow absorption of the liquid. Even dry blending of the other ingredients with a powdered elastomer before mastication does not produce a degree of dispersion adequate for calendering work.

Where bulk mixing of the liquid ingredients and dry ingredients have been previously attempted, large sticky agglomerates form that are difficult to disrupt and readily foul the mixing equipment, interfering with clean handling and transfer of the mix and making complete dispersion difficult. The problem is particularly difficult for those compositions containing zinc oxide because of the latter's propensity to form hard crystalline particles under impact mixing. These particles are virtually impossible to break up in subsequent Banbury or 2-roll mill mixing, and they interfere with the physical properties and appearance of the final elastomeric product. Though solid dispersions of zinc oxide and other dry pigments can be made in oils which are heat-bodied to a solid mass and thus readied for Banburying directly with an elastomer, such a procedure is not adapted to those elastomer compounds containing little or no zinc oxide and using predominantly non-bodyable oils or plasticizer.

A further problem exists in attempting to compound elastomers with attrited or ballmilled carbon blacks. For a long time such attrited blacks have been known to provide superior properties in elastomeric compounds, however, they are light and fluffy and exceptionally difficult to handle on a commercial basis. No completely satisfactory method for incorporating the attrited carbon blacks in an elastomer has heretofore existed.

This invention provides a means of rapidly achieving the required high degree of dispersion of compounding ingredients in elastomers without resorting to multi-step mixes, uneconomical extensions of mixing cycles, or straining of the stock through heavy extrusion equipment or use of special pigments or bodied oils. Reduction of as much as 80% in overall mixing time can be obtained. The process of this invention reduces danger of premature curing or scorching in both the mixing cycle, as well as in subsequent calendering, molding or extrusion. This process particularly affords a clean and convenient method for incorporating attrited or ballmilled carbon blacks in elastomeric calenderable compositions. Further, the process of this invention produces solvent cement compounds having an unexpected gain in aging stability.

The stocks prepared by the method of this invention not only have more uniform physical properties, but are at least equal to and often superior to those of identical compositions prepared by the best of conventional multi-stage mixing. The advantages of this invention are a direct result of the higher level of dispersion obtained. Such improved physical properties provide a further advantage, for it becomes practical for a compounder to use selected lower cost ingredients in the formulation, or reduce the level of costly ones and still maintain properties at the level achieved by conventional processing.

The process of this invention relies upon a specific sequence of bringing together the compounding ingredients of a plasticized elastomeric compound, i.e., the powders, the liquid plasticizer and the elastomer as follows:

First, the dry powder ingredients, that is, the carbon blacks, silicas or other reinforcing agents, pigments, fillers, curing agents, stabilizers, anti-oxidants, etc., are mixed together, comminuted or dispersed to form a uniform, fluffy or powdery blend. While maintaining this blend in this finely dispersed form, the liquid ingredients are added slowly, preferably in spray form. The resulting highly homogeneous dry particulate product, termed a premix, forms rapidly and is then suitable for rapid incorporation into the elastomer. This is done preferably by first masticating the elastomer in a high shear mixer, such as a Banbury mixer, for a short time, e.g., 2 to 10 minutes, and then adding the premix in one or more additions. The premix blends into the elastomer mass both rapidly and with nominal heat generation to form a highly uniform, substantially homogenous composition. Residual small amounts of the dry or liquid ingredients can be added thereafter in the mixer to allow for final formulation adjustments to the composition.

It is important in this invention to maintain the dry ingredients in a finely dispersed or powdery form while adding the liquid ingredients. By so doing, large sticky agglomerates are avoided that otherwise would foul the equipment, impede handling of the mix and make accurate compounding difficult or impossible to realize. A preferred method of maintaining the dry ingredients finely dispersed while adding the liquids is by intense agitation to generate a cloud of dry materials into which the liquids are sprayed. Exceptionally uniform premixes are thereby formed rapidly. Where a tumbling action of the batch accompanies the cloud mixing, the batch readily develops into a granular or bead-like form particularly desirable for ease of handling. Though the dry ingredients can be dispersed and the premix formed in any of several types of high intensity or shear mixers, a particularly useful mixer is that manufactured by the Patterson-Kelley Corporation of East Stroudsburg, Pennsylvania, and known as a Twin Shell Mixer with Intensifier Bar.

Premixes containing up to about 30% plasticizer can be made readily and are preferred. However, in mixes containing relatively high proportions of oil absorbing pigments and low proportions of low oil absorbing pigments or fillers, amounts of plasticizer above about 30% can also be used and still obtain a relatively dry, flowable, particulate premix. Premixes having more than about 10% plasticizer are preferred since they are less dusty to handle, however, amounts lower than 10% can be used.

The process of this invention, though particularly well adapted to acrylonitrile/butadiene type elastomers, is also suited to other types where liquid plasticizer is used, such as neoprenes, chlorosulfonated polyethylenes.

Throughout the specification and claims the term "dry" is used to describe the surface of particulate materials as being substantially devoid of free liquid such that the surfaces of the particles are not tacky or sticky.

The following examples illustrate various premixes and compositions that can be made by the process of this invention.

*Example I*

*Step 1.*—The following dry particulate ingredients, in the amounts indicated, were charged to a Twin Shell Liquid-Solids Blender manufactured by Patterson-Kelley of East Stroudsburg, Pennsylvania, and thoroughly mixed for three minutes:

| | Pounds | Percent |
|---|---|---|
| Carbon black | 3.24 | (29.34) |
| Zinc oxide | .72 | (6.52) |
| Calcium carbonate | 4.30 | (38.96) |
| Phenyl betanaphthylamine | .08 | (.72) |
| The following liquid plasticizer was next added slowly in the form of a spray (cloud) over a period of 105 seconds while the dry ingredients were being vigorously agitated: | | |
| Di(butoxyethyl)sebacate | 2.70 | (24.46) |
| Total | 11.04 | (100.00) |

After the liquid plasticizer was added, the mixing was continued for an additional 90 seconds and then the mixed charge, a dry powdery blend, or premix was discharged from the mill.

*Step 2.*—The Step 2 was carried out by combining the dry powdery blend with an elastomer and other ingredients on a laboratory two-roll rubber mill in the following proportions:

| | Grams | Percent |
|---|---|---|
| Elastomeric butadiene/acrylonitrile copolymer ("Paracril B") | 526.0 | (42.3) |
| Preblended ingredients from Step 1 | 645.3 | (51.9) |
| Stearic acid | 5.3 | (0.4) |
| Di(butoxyethyl) sebacate | 53.0 | (4.2) |
| Sulfur | 7.8 | (0.6) |
| Benzothiazyl disulfide | 7.8 | (0.6) |
| Total | 1,245.2 | (100.0) |

The elastomeric copolymer was first masticated on a two-roll rubber mill until one of the rolls was banded and then the remaining ingredients were added to the mill in the order listed, 75% of the total plasticizer being added via the premix. The total mixing time on the two-roll mill was 25 minutes after which the material was removed from the mill and calendered into the form of a film 20 mils thick, after which it was then cured by subjecting it to a temperature of 307° F. for a period of 30 minutes.

A control experiment was carried out by mixing in one step the same ingredients in the same proportions and amounts as employed in Step 2 of Example I, on a two-roll rubber mill until homogeneous. The control experiment involved mixing the following ingredients on the same two-roll rubber mill as employed in Example I:

| | Grams | Percent |
|---|---|---|
| Elastomeric butadiene/acrylonitrile copolymer ("Paracril B") | 526.0 | (42.3) |
| Carbon black | 189.0 | (15.2) |
| Zinc oxide | 42.0 | (3.4) |
| Calcium carbonate | 252.0 | (20.2) |
| Stearic acid | 5.3 | (0.4) |
| "Neozone D" (Phenylbetanaphthylamine) | 5.3 | (0.4) |
| Di(butoxyethyl) sebacate | 210.0 | (16.9) |
| Sulfur | 7.8 | (.6) |
| Benzothiazyl disulfide | 7.8 | (.6) |
| Total | 1,245.2 | (100.0) |

The above ingredients were thoroughly mixed by first banding one of the rolls of the two-roll rubber mill with the elastomeric copolymer then adding the remaining ingredients in the order listed. The total mixing time was 45 minutes. The composition, though still showing some specks (incompletely dispersed particles), was calendered into the form of a film 20 mils thick after which it was then cured by subjecting it to a temperature of 307° F. for 30 minutes.

The film prepared by the two-step process of this invention and the control film prepared by the single step in accordance with the prior art method were each tested and the following results were obtained:

| | Example I | Prior art (control) |
|---|---|---|
| Film thickness, mils | 20 | 20 |
| Hardness (Shore A) | 40 | 36 |
| Tensile strength, p.s.i. | 1,543 | 1,046 |
| Modulus at 300% elongation, p.s.i. | 233 | 193 |
| Elongation (90) | 797 | 757 |
| Volume swell in SR-6 solvent, 24 hrs. at 25° C., percent | 33.6 | 30.6 |
| Degree of Dispersion | (¹) | (²) |

¹ Very good.
² Poor.

Example II

Example I was repeated in which the formula for Step 1 was changed to:

|  | Pounds | Percent |
|---|---|---|
| Carbon black | 3.24 | (31.32) |
| Calcium carbonate | 4.30 | (41.70) |
| Phenylbetanaphthylamine | .08 | (0.78) |
| Di (butoxyethyl) sebacate | 2.70 | (26.20) |
| Total | 10.32 | (100.00) |

The formula for Step 2 was changed to:

|  | Grams | Percent |
|---|---|---|
| Elastomeric butadiene/acrylonitrile copolymer ("Paracril B") | 526.0 | (42.3) |
| Zinc oxide | 42.2 | (3.4) |
| Preblend of Step 1 | 603.1 | (48.5) |
| Stearic acid | 5.3 | (0.4) |
| Di (butoxyethyl) sebacate | 53.0 | (4.2) |
| Sulfur | 7.8 | (0.6) |
| Benzothiazyl disulfide | 7.8 | (0.6) |
| Total | 1,245.2 | (100.0) |

Results essentially equivalent to Example I were obtained.

Example III

Example I was repeated, however, the amount of plasticizer added at the premix was increased to 87% from 75% of the total formulation. This was done by (a) increasing from 2.70 lbs. to 3.14 lbs., the amount of plasticizer in Step 1 premix; and (b) in Step 2 increasing the amount of premix from 645 grams to 670 grams and decreasing the plasticizer from 53 grams to 28 grams.

Results essentially equivalent to Examples I and II were obtained.

Example IV

The following dry ingredients were charged to a high intensity mixer and finely dispersed:

Step 1—

|  | Lbs. |
|---|---|
| Crown clay | 250.00 |
| Zinc oxide | 18.75 |
| Sulfur | 6.60 |
| Tetramethyl thiuram monosulfide | 0.96 |
| Benzothiazyl disulfide | 6.60 |

To the above dry dispersion were added 68.25 lbs. of di(butoxyethyl)phthalate in spray form by a series of spray nozzles in the mixer at the rate of about 10 lbs. per minute while violently agitating the dry ingredients. In about three minutes a highly uniform, dry granular premix was formed, eminently well suited for rapid addition to an elastomer in a Banbury mixer.

Step 2.—In a Banbury mixer, 125 lbs. of "Hycar" 1042 acrylonitrile/butadiene copolymer rubber were masticated for about three minutes and then 100 lbs. of crown clay and 5 lbs. of channel carbon black were added and mixed for two minutes. Then 117 lbs. of the above dry granular premix were added and mixed with low ram pressure for about six minutes. Finally, 1.25 lbs. of stearic acid were added, the ram pressured and mixing continued for two more minutes. A total of 17 minutes' Banbury time was consumed. The homogeneous mixture was discharged from the Banbury mixer, the stock sheeted out on a hot calender mill to about 10 mils thickness and the sheet cured 30 minutes at 307° F.

The same type composition was prepared without the premix step as a control experiment, adding the ingredients stepwise to the elastomer in the Banbury and milling for about 20 minutes. The mill was discharged, the stock slabbed out about ½" thick and allowed to cool. The batch was then split into two equal portions and each half milled and worked on a 2-roll mill for about 50 minutes before adequate dispersion of the ingredients was obtained.

Calendered and cured 20 mil sheets were prepared as before indicated from the compound mixed in accordance with Example IV and the control compound made by conventional stepwise mixing procedure. The following physical properties were determined on each sheet:

|  | Premixed compound | Conventional compound |
|---|---|---|
| Tensile strength, p.s.i | 1,900 | 1,782 |
| 300% modulus, p.s.i | 1,490 | 997 |
| Elongation to break, percent | 490 | 609 |
| Shore A hardness | 72 | 67 |

A total of 120 minutes' heavy duty mixing was required for the conventional mixing procedure (control for Example IV) versus only about 17 minutes for the Example IV procedure. Thus Example IV results in a saving of about 86% milling time versus the conventional procedure.

Example V

Step 1.—An intensive mixer equipped with a liquid injector was charged with the following ingredients:

|  | Lbs. |
|---|---|
| SR furnace carbon black | 225.00 |
| Medium thermal carbon black | 34.50 |
| Sulfur | 8.40 |
| Phenylbetanaphthylamine | 9.21 |
| Heliozone wax | 4.50 |
| Benzothiazyl disulfide | 6.75 |
|  | 288.36 |

After intensive mixing until uniform (about 10 minutes), 72 lbs. of di(butoxyethyl)sebacate were slowly injected into the mill over a period of about 10 minutes while continuing the mixing. At the end of about another 10 minutes' mixing, the charge was converted to a uniform dry powdery premix.

Step 2.—One hundred fifty (150) lbs. of "Hycar" 1042 butadiene/acrylonitrile copolymer rubber was masticated in a Banbury mixer for about 3 minutes. Then the following ingredients were added in the order listed and mixed for the indicated time:

|  | Pounds | Mixing time in minutes after each ingredient is added |
|---|---|---|
| Zinc oxide | 7.50 | 1 |
| Medium thermal carbon black | 50.00 | 2 |
| Step 1 premix | 120.00 |  |
| Polypropylene glycol adipate ("Paraplex" G-40) | 22.50 | [1] 7 |
| Stearic acid | 3.00 | 2 |

[1] Last 5 with ram pressure.

The homogeneous mix was then slabbed out on a 2-roll mill and calendered to a 20 mil thick film. After drum curing for 4 hours at 260° F., a smooth, exceptionally uniform high tensile product resulted.

The same product prepared by conventional Banbury procedures without the plasticizer premix, required about 20 minutes to become incorporated in the Banbury mixer, followed by about 45 minutes' 2-roll milling for each half of the batch before a satisfactory product could be prepared. Even with this extended milling time, specks of poorly dispersed ingredients were visible in the sheet.

*Example VI*

*Step 1.*—Using the equipment and method of Example I, a premix of the following ingredients was prepared by mixing the following dry materials for about six minutes:

| | Lbs. |
|---|---|
| Carbon black (MT) | 50 |
| Clay (crown) | 210 |
| Tetramethyl thiuram monosulfide | 2.6 |
| Benzothiazyl disulfide | 3.9 |
| Sulfur | 8.5 |
| | 275.0 |

Then 31.5 lbs. of a petroleum fraction such as Circo Light process oil made by Sun Oil Company were pumped in during a period of about four minutes and the mixing continued for an additional six minutes. A dry, granular premix resulted.

*Step 2.*—The following formula was masticated stepwise in a Banbury mixer:

| | Pounds | Mixing time in minutes |
|---|---|---|
| Butadiene/styrene elastomer | 140 | 2 |
| Dehydroabietic acid | 7 | |
| Zinc oxide | 14 | |
| Carbon black | 71 | 5 |
| Dibetanaphthylparaphenylenediamine | 0.88 | |
| Premix of Step 1 | 102 | |
| Stearic acid | 2.62 | 4 |
| Factice | 14 | |
| Total | 351.50 | 11 |

The Banbury stock was then sheeted out to 20 mil thickness on a calendar and cured for about 45 minutes at 307° F. The sheet had the following average properties:

| | |
|---|---|
| Tensile strength, p.s.i. | 1550 |
| Elongation, percent | 430 |
| Modulus at 200% elongation, p.s.i. | 910 |
| Shore A hardness | 65 |

*Example VII*

*Step 1.*—A high intensity mixer was charged with the following dry ingredients:

| | Lbs. |
|---|---|
| Carbon black (SRF) | 300 |
| Magnesium oxide | 24 |
| Zinc oxide | 30 |
| Antioxidant (Calco #2246) | 12 |
| | 366 |

After the materials were blended about six minutes, 72 lbs. of trioctyl phosphate were pumped in over a period of about six minutes while continuing mixing. After a total of about 18 minutes, a dry, granular premix was produced.

*Step 2.*—A Banbury mixer was charged and mixed stepwise with the following:

| | Pounds | Mixing time in minutes |
|---|---|---|
| Polychloroprene (Neoprene WRT) | 200 | 5 |
| Step 1 premix | 146 | 4 |
| 2-mercaptoimidazoline | 2 | 3 |
| Total | 348 | 12 |

The finished stock was then sheeted out on a calendar to about 20 mils thickness and then the sheets cured for about 45 minutes at 307° F. The sheet had about the following average properties:

| | |
|---|---|
| Tensile strength, p.s.i. | 1750 |
| Elongation, percent | 250 |
| Modulus at 200% elongation, p.s.i. | 1325 |
| Shore A hardness | 60 |

*Example VIII*

*Step 1.*—As in Example I, a Patterson-Kelley mixer was charged with the following dry ingredients and blended for about five minutes:

| | Lbs. |
|---|---|
| Clay (Dixie) | 180 |
| Tribasic lead maleate | 72 |
| Rutile pigment ("Ti Pure" R–510) | 9 |
| Carbon black | 0.4 |
| Tetramethyl thiuram disulfide | 3.6 |
| 2-mercaptoimidazoline | 0.9 |
| | 265.9 |

Then 18 lbs. of a petroleum fraction, such as Sun Oil Company's Circo Light processing oil, are sprayed in slowly for about three minutes while continuing mixing. An additional four minutes' mixing converts the materials to a dry, granular premix.

*Step. 2.*—A 2 roll mill was banded with 60 lbs. of a chlorosulfonatedpolyethylene, such as "Hypalon" 20—E. I. du Pont de Nemours & Company, Inc., and masticated for about 5 minutes with 3 lbs. of a hydrogenated rosin. About 95 lbs. of the premix of Step 1 were then slowly added to the masticated rubber. The premix was incorporated into the batch in about 15 minutes at which time dispersion was complete. The mill stock was then sheeted out on a calender to 15 mils thickness and the sheets cured for about 45 minutes at 307° F. The sheets had the following average properties:

| | |
|---|---|
| Tensile strength, p.s.i. | 1640 |
| Elongation, percent | 147 |
| Shore A hardness | 78 |

I claim:

A process for incorporating powder and liquid additives into elastomers, said process comprising (a) blending said powder additives to give a homogeneous mixture, (b) generating a cloud of said mixture in air, (c) spraying said liquid additives into the cloud, and then (d) blending the resulting dry additive product with an elastomer.

References Cited by the Examiner

UNITED STATES PATENTS

| | | | |
|---|---|---|---|
| 2,050,193 | 8/1936 | Park | 106—307 |
| 2,067,060 | 1/1937 | Minor | 106—307 |
| 2,477,009 | 7/1947 | Sandler | 106—198 |
| 3,085,988 | 5/1963 | Hull et al. | 260—34.2 |

MORRIS LIEBMAN, *Primary Examiner.*

A. O. DENT, B. A. AMERNICK, *Assistant Examiners.*